(12) United States Patent
Fujii

(10) Patent No.: US 7,045,923 B2
(45) Date of Patent: May 16, 2006

(54) MAGNETIZING METHOD AND PERMANENT MAGNET MAGNETIZED THEREBY

(75) Inventor: Hiromasa Fujii, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/710,296

(22) Filed: Jun. 30, 2004

(65) Prior Publication Data

US 2005/0001501 A1    Jan. 6, 2005

(30) Foreign Application Priority Data

Jul. 1, 2003 (JP) .............................. 2003-189134

(51) Int. Cl.
*H02K 21/12* (2006.01)
(52) U.S. Cl. ........................... 310/156.43; 310/156.45; 310/216
(58) Field of Classification Search ............ 310/42–45, 310/156.23, 156.43–156.45, 216, 261, 89, 310/67 R
See application file for complete search history.

(56) References Cited

U.S. PATENT DOCUMENTS

| | | | |
|---|---|---|---|
| 6,104,115 A * | 8/2000 | Offringa et al. ....... | 310/156.28 |
| 6,274,962 B1 * | 8/2001 | Kliman ....................... | 310/261 |
| 6,751,842 B1 * | 6/2004 | Roesel et al. ................. | 29/598 |

FOREIGN PATENT DOCUMENTS

| | | |
|---|---|---|
| JP | S60-054406 A | 3/1985 |
| JP | H05-039596 A | 2/1993 |
| JP | H06-038493 A | 2/1994 |
| JP | H07-161516 A | 6/1995 |
| JP | H08-001830 A | 1/1996 |
| JP | H08-186016 A | 7/1996 |
| JP | 2546988 B2 | 8/1996 |
| JP | H08-223872 A | 8/1996 |
| JP | 2599753 B2 | 1/1997 |
| JP | 2681797 B2 | 8/1997 |
| JP | 2685136 B2 | 8/1997 |
| JP | H11-003811 A | 1/1999 |
| JP | H11-204320 A | 7/1999 |
| JP | H11-224811 A | 8/1999 |
| JP | H11-308825 A | 11/1999 |
| JP | 2000-091112 A | 3/2000 |
| JP | 2001-061261 A | 3/2001 |
| JP | 2001-250707 A | 9/2001 |
| JP | 2001-267162 A | 9/2001 |
| JP | 2002-291225 A | 10/2002 |
| JP | 2003-017323 A | 1/2003 |

* cited by examiner

*Primary Examiner*—Thanh Lam
(74) *Attorney, Agent, or Firm*—Judge Patent Firm

(57) ABSTRACT

A conductive attenuation body is arranged close to at least a part of surface of a material to be magnetized which has far lower conductivity than that of the attenuation body. Furthermore, the change in magnetic flux during magnetization is rapidly intensified for a sufficiently short period of time and rapidly weakened. The magnetization flux is impressed in form of penetrating the attenuation body. With the rapid change in the magnetization flux over time, in the conductive attenuation body, an eddy current is generated in a direction canceling the magnetization flux and thus the magnetization field weakens. The magnetization waveform can be adjusted by adjusting a thickness, an arrangement shape or expanse of the attenuation body.

22 Claims, 10 Drawing Sheets

MAGNETIZING METHOD AND PERMANENT MAGNET MAGNETIZED THEREBY

BACKGROUND OF INVENTION

1. Field of the Invention

The present invention relates to a magnetizing method, a permanent magnet magnetized by the method, and a motor equipped with the permanent magnet. Particularly, the present invention relates to a permanent magnet suitable for a rotor magnet of a spindle motor obtained by multipole magnetization and a magnetizing method thereof.

2. Background Art

A magnetization waveform of a permanent magnet for driving a motor largely affects conversion efficiency of torque, vibration, and energy of the motor, or the like. It is well-known that by making the magnetization waveform into a ideal sine waveform, the property can be improved.

Therefore, improvements in the magnetization waveform, heretofore, have been performed by contriving a shape of a yoke in a magnetizing device. Nevertheless, remaining high-order harmonic components in the magnetization waveform cannot be avoided.

Furthermore, with regard to a permanent magnet, its surface is easy to corrode, so that plating or coating is applied for the purpose of surface protection. For example, a technique of applying corrosion-resisting plating on a surface of a rare earth-B—Fe based permanent magnet or the like has been employed.

These plating and coating are intended solely to improve corrosion resistance. For the plating material, a ferromagnetic material such as Ni has normally been used in order not to impair the function of the permanent magnet.

However, the coating applied to the permanent magnet has not contributed to the improvement in the magnetization waveform.

SUMMARY OF INVENTION

A first object of the present invention is to provide a magnetizing method which makes it easy to adjust a magnetization waveform.

A second object of the present invention is to provide a magnetizing method which makes it easy to adjust magnetization conditions and enables a more appropriate magnetization waveform to be obtained.

A third object of the present invention is to provide a high-performance motor using a permanent magnet obtained by achieving the first and the second objects.

According to the present invention, a conductive attenuation body is arranged close to at least a part of surface of a material to be magnetized. The material is a substance having a far lower conductivity than that of the attenuation body. Furthermore, the change in magnetic field during magnetization is a so-called pulse, that is, magnetic flux thereof is rapidly intesified for a sufficiently short period of time and then rapidly weakened.

The magnetization flux is impressed in form of penetrating the attenuation body. With the rapid change in the magnetization flux over time, in the conductive attenuation body, an eddy current is generated in a direction canceling the magnetization flux and thus the magnetization field weakens. The magnetization waveform can be adjusted by adjusting a thickness, an arrangement shape or expanse of the attenuation body.

It is more preferable that this attenuation body is made of a substance of feeble magnetism. The substance of feeble magnetism is a substance exhibiting paramagnetism or diamagnetism. In the case where this attenuation body is made of a ferromagnetic substance, the attenuation body itself entails spontaneous magnetization. However, the attenuation body made of the substance of feeble magnetism hardly causes the spontaneous magnetization during magnetization, which makes it easy to adjust a magnetization pattern.

It is preferable that this material to be magnetized has a platy shape or a cylindrical shape, and that the magnetization is performed in a thickness direction thereof. For example, the shape includes a flat plate shape, roof tile shape (parallel surface shape with curved surfaces), shape of slit cylindrical wall, shape of side wall of cylinder, and shape of side wall surface of polygonal column. In this case, the attenuation body is arranged close to at least one of the surfaces defining this thickness along the material. A surface resistance Rs of the attenuation body satisfies the formula $$3.0 \times 10^{-5} \leq Rs \leq 1.0 \times 10^{-2} \; [\Omega/\mathrm{sq.}] \qquad (1).$$

In particular, by adjusting the surface resistance of the attenuation body so as to fall within the range of these values, there is obtained a range in which an induction current generated by the magnetization field can be controlled.

If the change in magnetization field is not rapid with respect to time, the eddy current is not generated in the attenuation body during magnetization. Accordingly, the magnetizing device is a device generating a pulse magnetic field. The pulse magnetizing device comprises a capacitor, a power source for charging the capacitor, a magnetizing coil connected to the capacitor, and a magnetizing yoke around which the magnetizing coil is wound. This magnetic yoke forms a part of magnetic circuit and has an opening surface in an extending direction of the magnetic circuit. The material to be magnetized is contraposed to the opening surface of the magnetic circuit of the magnetic yoke to form the closed magnetic circuit. The capacitor is beforehand charged by the power source, and then rapidly discharged in the state that this closed magnetic circuit is formed to rapidly pass a current through the coil. By passing the current through the coil, a magnetic field is generated in the magnetic yoke, magnetic flux passes through the closed magnetic circuit. In this way, the material is magnetized. Use of this magnetizing method allows a permanent magnet to be formed with a relatively low-cost structure. The magnetization may be performed for each magnetic pole, or may be performed for a plurality of magnetic poles simultaneously.

Furthermore, it is more preferable to adjust a time $\Delta t$ from the start of discharging the pulse current until the current value reaches the maximum so as to satisfy the formula $$2.0 \times 10^{-5} \leq \Delta t \leq 5.0 \times 10^{-3} \; [\mathrm{sec.}] \qquad (2).$$

When $\Delta t$ is larger than this range, the induction current induced by the attenuation body is weak, and thus an effect of correcting the magnetization field is weak. In addition, since power consumption becomes large, a heat release value of the coil becomes large. In contrast, when $\Delta t$ is smaller than this range, the magnetic field is cancelled by the induction current. In order to avoid this situation, the magnetizing current needs to be increased and thus the heat release value of the coil is increased. However, when the above-mentioned drawback does not cause trouble, the magnetizing method of the present invention can be carried out even if $\Delta t$ is outside of this range.

The material to be magnetized may be a Nd—Fe—B based bond magnet. The bond magnet is easy to be formed into various shapes. The magnetization waveform can be changed by the shape of the material, and thus it becomes easier to improve the magnetization waveform.

The material may have a cylindrical shape, and may have the attenuation body arranged in any one of an inner circumferential surface and an outer circumferential surface thereof. At this time, it is preferable that the shape of the attenuation body is circular shaped to cover the inner circumferential surface or the outer circumferential surface all around. This can improve the magnetization waveform at the time of multipole magnetization. Furthermore, the cylindrical material is preferable in shape as a field magnet of rotating equipment such as electric motor.

Although the magnetization waveform is ideally a perfect sine wave without harmonics, there is generated the harmonics that distort the waveform. A diameter of any one to be magnetized, out of the inner circumferential surface and the outer circumferential surface of the cylindrical material, is defined as R, and in the case where the magnetization is performed with respect to both of the inner and the outer circumferential surfaces, a diameter of the outer circumferential surface is defined as R. Furthermore, if the number of the magnetized poles is defined as P, and an axial height perpendicular to a radial direction of the cylindrical shape is defined as h, h is set so as to satisfy the formula $$h < \pi R/P \text{ [mm]} \tag{3}$$

Under this condition, the harmonic components of the magnetization waveform are suppressed.

The operation is described hereinafter. In the case where radial pulse magnetization is applied to the cylindrical material, an eddy current is induced in the attenuation body arranged on the magnetization surface of the material in a direction canceling the magnetization field. The distribution of this eddy induction current depends on the intensity of the magnetization field. There is a difference in easiness of current flow between the eddy current arising from the fundamental wave component of the magnetization field and the eddy current arising from the harmonic component. In particular, in the case where the cylindrical material is short in the axial length and is flat, the eddy current arising from the harmonic component flows more easily. Accordingly, the harmonic component of the magnetization field is weakened by the eddy induction current.

Specifically, the foregoing is as shown in FIG. 5. FIG. 5A shows a cylindrical permanent magnet subjected to four-pole magnetization. In this figure, it is premised that the attenuation body is arranged in the outer circumferential surface of the material. Reference character L in the figure is equivalent to a wavelength of the fundamental wave and is given by dividing a circumferential length by the number of the poles ($L = \pi R/P$). Reference character h is the axial length of the cylindrical material.

FIG. 5B is a view taking out the attenuation body arranged on the surface of the material to be magnetized by L and developing it, in which the induction current is illustrated by ellipses with arrows. Furthermore, reference character w denotes a half length of the wavelength of the magnetic filed to be impressed. In FIG. 5B, w and L are identical and w is longer than h. The induction current, therefore, is subject to a restriction of the surface shape and the induction current becomes smaller for magnetic flux density. Accordingly, the induction current does not remarkably arise and the fundamental wave component of the magnetization waveform is cancelled a little.

On the other hand, FIG. 5C illustrates a third-order harmonic component in the surface of the attenuation body. In this case, w is one-third of L. If w and h are set to be almost the same in length under the condition of h<L, symmetry of the electric conductor as viewed from the center of the magnetic flux is high and the intensity of the induction current with respect to the magnetic flux density increases. Accordingly, the third-order harmonic component of the magnetization waveform is cancelled by the induction current generated in the attenuation body. The harmonic component, therefore, is actually attenuated.

Furthermore, FIG. 5D shows a fifth-order harmonic component in the surface of the attenuation body. In this figure, h is larger than w. In this state, since the induction current is subject to the restriction of the shape of the electric conductor part, the intensity of the induction current with respect to the magnetic flux density decreases. The fifth-order harmonic component which is a higher harmonic component, therefore, is hardly attenuated by the induction current and thus remains as the magnetization waveform.

Considering all the above description together, with regard to the third-order harmonic component in which the wavelength of the component and the axial height h are almost identical, the magnetization field is weakened by the induction current generated in the attenuation body, while the induction current is less generated in the attenuation body by magnetization waveform of the fundamental wave component of the magnetization field, and thus the magnetization is performed with the fundamental waveform of the magnetization field with less harmonics. Furthermore, such an extremely short wavelength component as the fifth-order harmonic component remains without attenuating. However, shortening h with respect to the wavelength can attenuate higher harmonic components. For example, respective wavelength components of the magnetizing device may be measured in advance, and h may be designed so as to be almost the same as the wavelength w of a harmonic component desired to attenuate. Alternatively, by presetting h and setting the number of poles P, appropriate w can be set.

In terms of the foregoing, with respect to the wavelength L of the fundamental waveform of the magnetization waveform, an effective range can be determined by the diameter R of the magnetization circumferential surface and the number of magnetized poles P as a relation with the axial height h of the material to be magnetized and the electric conductor of the attenuation body. Specifically, when h is shorter than L, that is, in the range of $h < \pi R/P$, the components of longer wavelength than the wavelength of the fundamental wave are attenuated. However, in the case where h is a value approximate to L, the fundamental wavelength is also attenuated. Thus, the range of $h < \pi R/(1.5P)$ is better in magnetization efficiency because the fundamental waveform does not attenuate largely. A lower limit of h cannot be derived only from the above description. However, it is rare that the material to be magnetized with h below $\pi R/10P$ is actually used.

Furthermore, it is preferable that the diameter of the outer circumferential surface of the cylindrical shape is 10 to 30 mm, and a radial wall thickness of the material to be magnetized is 0.5 to 3 mm. The surface resistance Rs of the attenuation body in this case desirably satisfies the formula $$3.0 \times 10^{-4} \leq Rs \leq 1.0 \times 10^{-3} \text{ [}\Omega/\text{sq.]} \tag{4}$$

In particular, when mounted on small size rotating equipment, the attenuation body with the surface resistance in this range is preferable. Furthermore, by setting it within this range, the harmonic components of the magnetization waveform can be further suppressed.

It is more preferable that the attenuation body is formed on the surface of the material as a coating layer. A coating method includes plating. By integrally forming the attenuation body by plating, the present invention can be carried out in large numbers and at low cost. Furthermore, the integral formation makes the handling easy. In addition, plating allows the attenuation body to be uniformly formed on the surface of the material, and thus nonuniformity of the magnetization due to the induction current can be reduced.

It is more preferable that a corrosion-resistant paint film layer is formed on the film layer of the attenuation body. As the corrosion-resistant paint film layer, an epoxy resin is exemplified. This provides a uniform paint film and improves the corrosion resistance. As a method for forming this paint film, electrodeposition painting, spray painting, or electrostatic painting may be used.

The permanent magnet obtained by carrying out the present invention can be mounted on an electric motor. In the motor of the present invention, the magnetization waveform is approximate to a sine wave which is ideal, and less harmonic components causing vibration and deterioration in driving efficiency. Accordingly, high-efficiency electric motors with less vibration can be obtained.

BRIEF DESCRIPTION OF DRAWINGS

Referring now to the attached drawings which form a part of this original disclosure:

FIG. 5 is a schematic view indicating a length L obtained by dividing a circumferential length $\pi R$ by the number of magnetized poles P, a magnetization wavelength component w, and an axial length h of the permanent magnet.

DETAILED DESCRIPTION

Figure 1:
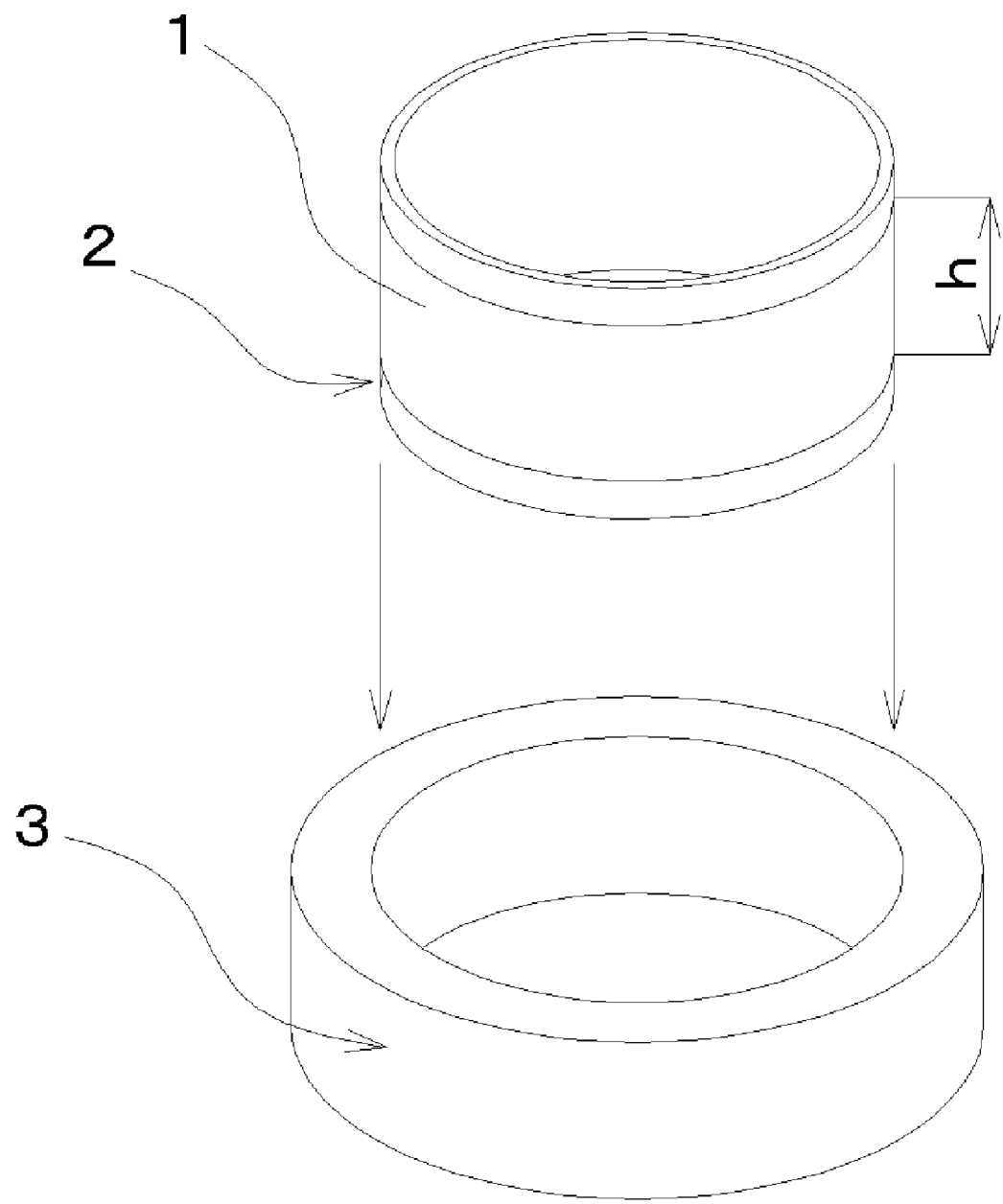
FIG. 1 is a schematic view showing mounting of an attenuation body on a material to be magnetized according to the present invention.

Best modes of the present invention are described, using the drawings.

EMBODIMENT 1

A first embodiment of the present invention is described using FIGS. 1 to 5. In the description of the embodiments according to the present invention, when some expression indicating vertical or horizontal directions or the like is used, it indicates the directions illustrated in the drawings if there is no particular description, and actual embodiments are not limited to these.

FIG. 1 shows a cylindrical material 3 manufactured according to the embodiment of the present invention, and an attenuation body 2 attached in an inner circumferential surface of the cylindrical material 3 at the time of magnetization. The attenuation body has a copper foil 1 and a polyimide film to be structured analogously to an FPC (Flexible Printed Circuit-Board). In FIG. 1, in order to apply the magnetization from the inner circumferential side, the attenuation body is arranged on the inner circumferential side. A similar attenuation body, however, may be arranged on the outer circumferential side in the case where the magnetization is applied from an outer circumference or may be arranged on the inner and outer circumferential surfaces in the case where the magnetization is applied from both the inner and the outer circumferential sides.

The attenuation body 2 is made of a conductive material, and in addition to copper, aluminum, tin, chrome, nickel or other good conductive materials can be used. Furthermore, it is more preferable that these materials have feeble magnetism.

In FIG. 1, an axial height h of the copper foil 1 of the attenuation body 2 corresponds to an axial height of the material 3. An upper end and a lower end of the copper foil 1 are brought into line with an upper end and a lower end of the material 3, respectively using a jig or the like.

Figure 2:
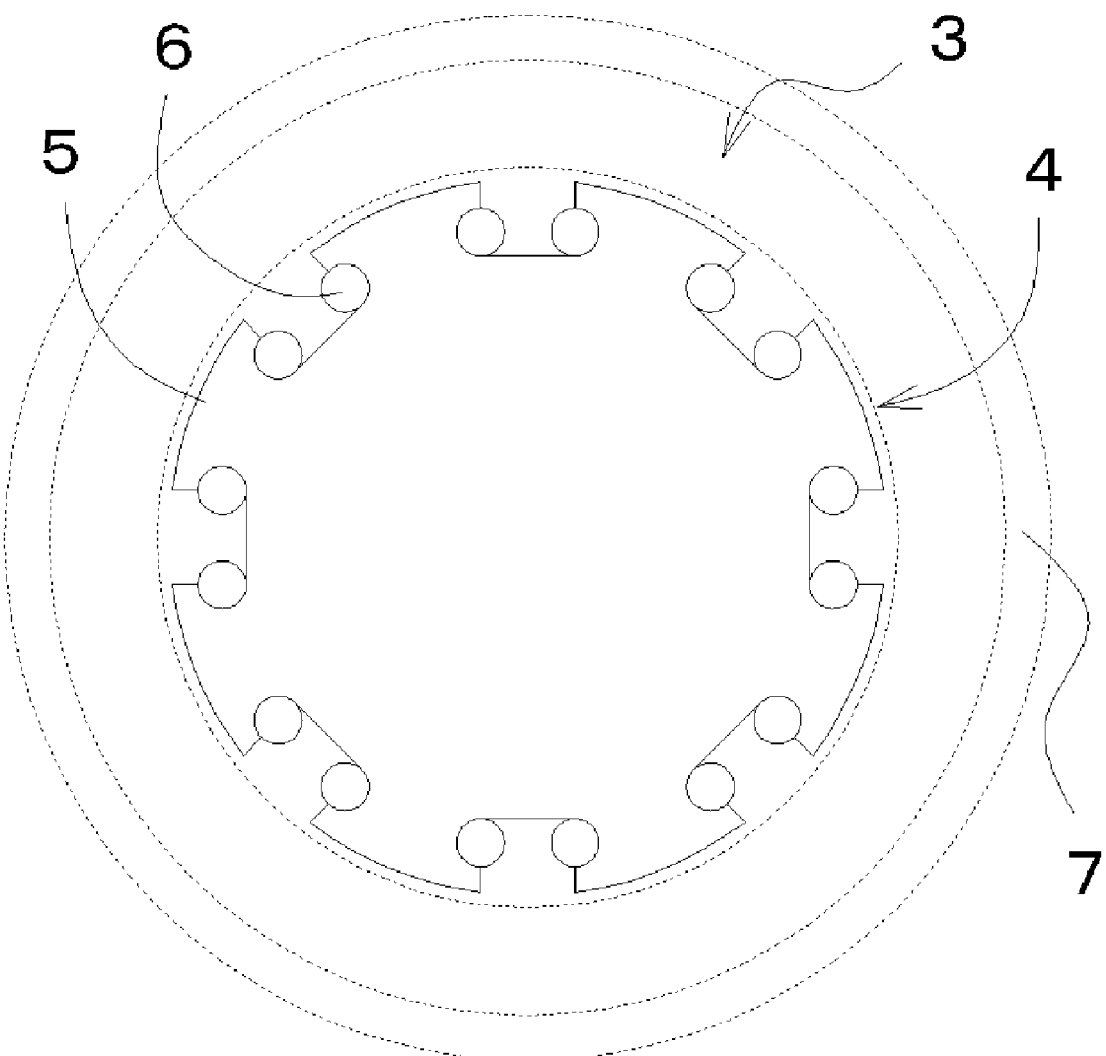
FIG. 2 is a plan view of a magnetizing yoke of the present invention.

FIG. 2 shows a magnetizing yoke which is a part of a magnetizing device. A magnetizing coil 6 is wound in a projected part 5 of the magnetizing yoke. The inner circumferential surface of the material 3 is opposed to the projected part 5 of the magnetizing yoke to form a magnetic pole centering on a part opposed to the projected part 5. Although omitted in FIG. 2, the attenuation body 2 is arranged in a radial gap between the material 3 and the projected part 5. An annular yoke 7 may be attached on the outer side of the material 3, which is not opposed to the magnetizing yoke. The attachment of the annular yoke 7 can reduce leakage flux and improve magnetizing efficiency.

According to the present embodiment, the diameter of the outer circumferential surface of the material 3 is 28.2 [mm], the diameter of the inner circumferential surface R is 26.2 [mm], the axial height h is 4.6 [mm], and the radial wall thickness is 1.0 [mm]. The material 3 is a Nd—Fe—B bond magnet. Its surface is coated with an epoxy resin. The number of the magnetized poles is eight, and the axial height h of the attenuation body 2 satisfies formula 3. The surface resistance Rs of the used copper foil 1 is expressed by $6.0 \times 10^{-4}[\Omega/sq.]$ and is in the range of formula 4.

A pulse current is applied to the magnetizing coil 6 of the magnetizing yoke 4 by a capacitor type pulse magnetizing device. The pulse magnetizing device is equipped with a capacitor and a power supply for charging the capacitor. The magnetizing coil 6 is connected to the capacitor. First, the capacitor is charged using the power supply, and when discharging the capacitor, the pulse current is applied to the magnetizing coil 6 to magnetize the material 3.

In the present embodiment, a capacitance of the capacitor at the time of magnetization is 800 [μF], a magnetizing current is 15 [kA]. In the case where the magnetization is performed without using the attenuation body 2, a magnetizing current of 13 [kA] is required to obtain equivalent torque.

The magnetizing current required to this equivalent torque varies depending on the material quality of the attenuation body 2, and the shape and quality of the material 3. Furthermore, the attenuation body 2 may be formed integrally with the material 3. In this case, the material 3 is advantageously subjected to plating for covering. The plating improves the magnetization waveform and enhances the corrosion resistance.

Figure 3:
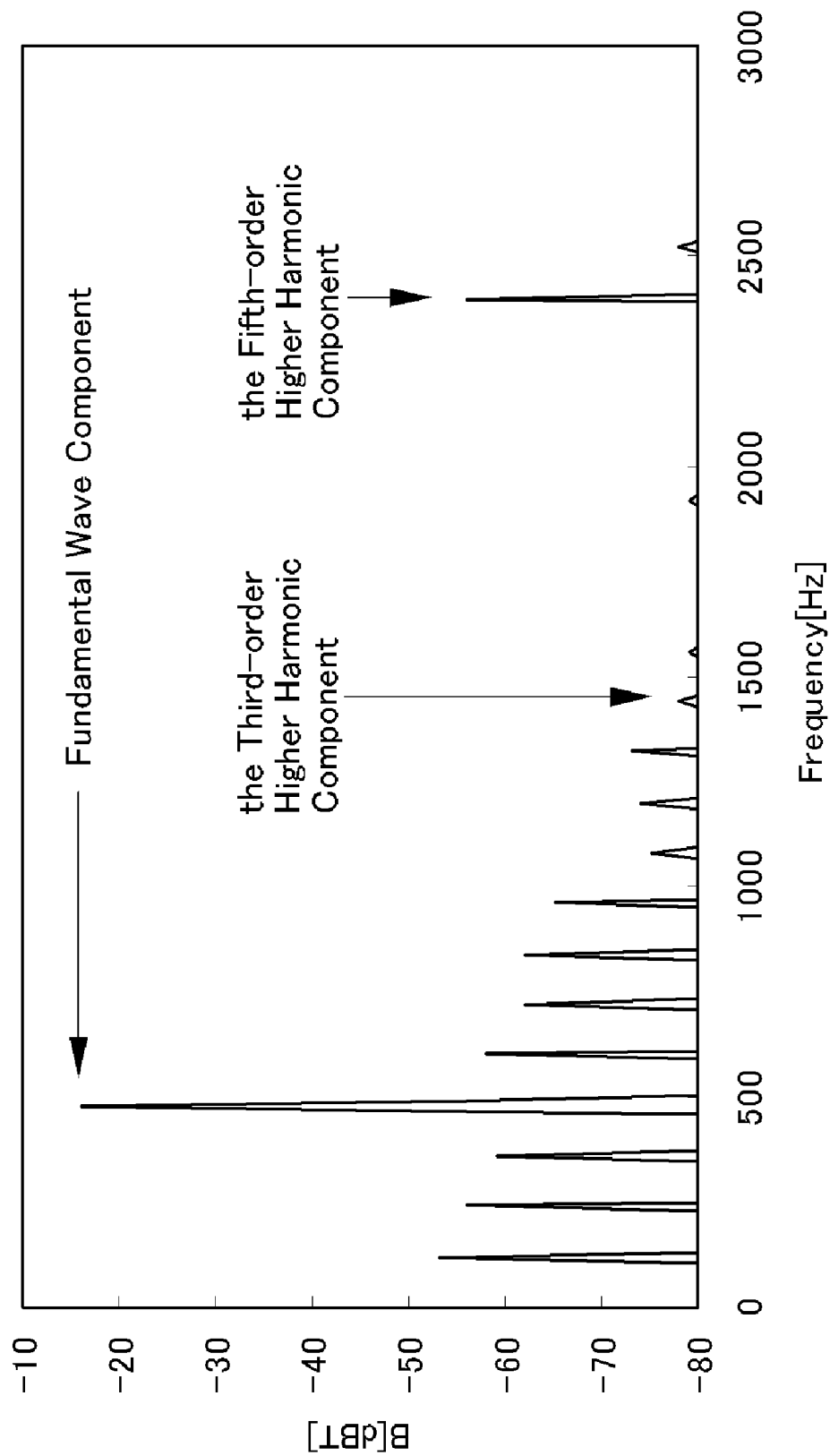
FIG. 3 shows a magnetization waveform of a permanent magnet obtained by the present invention.
Figure 4:
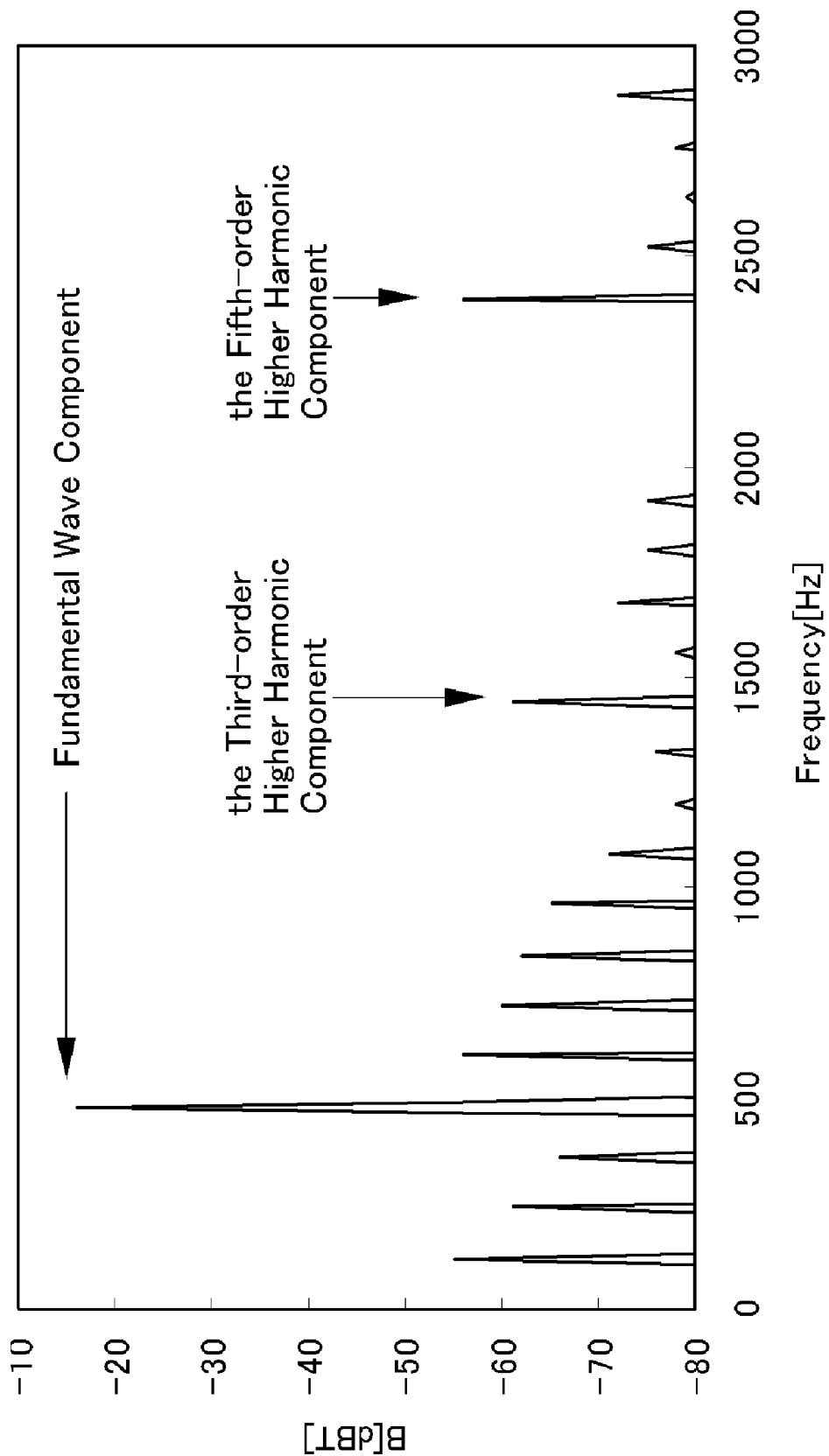
FIG. 4 shows a magnetization waveform of a conventional permanent magnet.
Figure 5A:
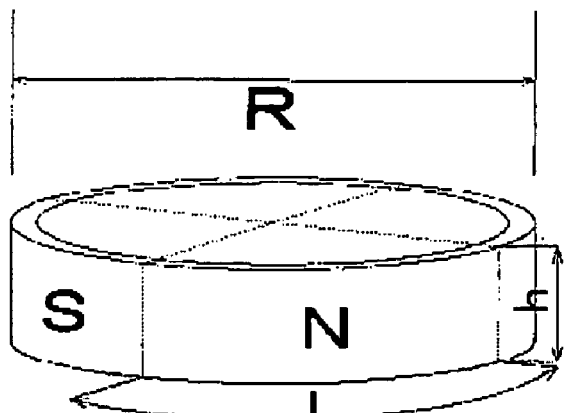
FIG. 5A is a schematic view of a cylindrical permanent magnet subjected to four-pole magnetization.
Figure 5B:
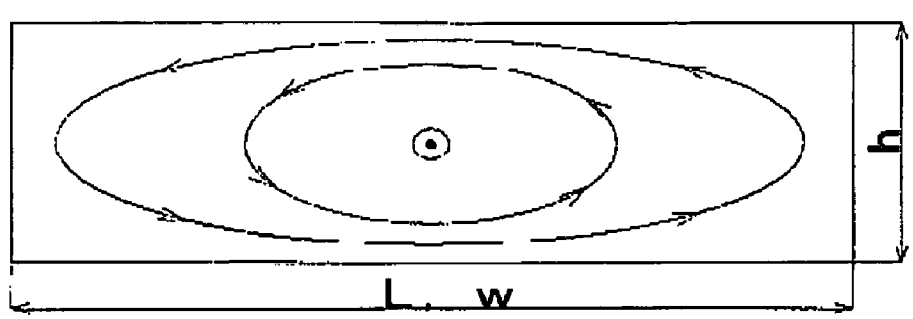
FIG. 5B is a schematic view taking out the attenuation body arranged on the surface of the material to be magnetized by L and developing it, in which the induction current is illustrated by ellipses with arrows.
Figure 5C:
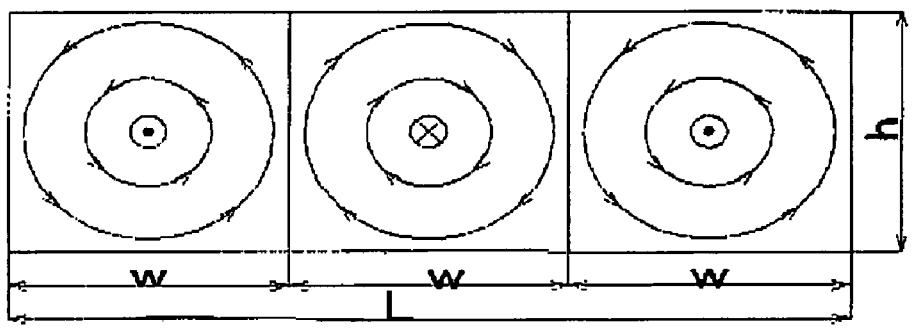
FIG. 5C is a schematic view of a third-order harmonic component in the surface of the attenuation body.
Figure 5D:
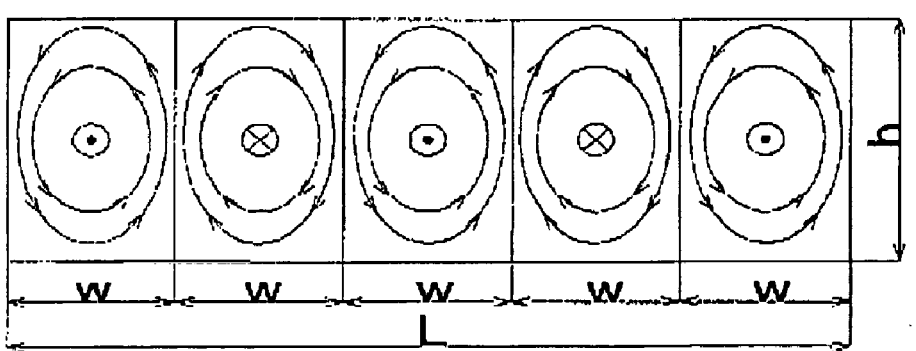
FIG. 5D is a schematic view of a fifth-order harmonic component in the surface of the attenuation body.

FIG. 3 shows wavelength components of a magnetization waveform of a permanent magnet magnetized with the attenuation body 2 attached to the material 3. On the other hand, FIG. 4 shows the wavelength components of a magnetization waveform of a permanent magnet obtained by magnetizing the material in a conventional magnetizing method without attenuation body 2. In order to compare FIGS. 3 and 4, the respective vertical axes and horizontal axes are standardized.

As a measuring method, a Hall element is opposed to a magnetized surface of the permanent magnet and rotates the permanent magnet to measure an output signal of the Hall element. The output signal is converted based on 7200 [rpm] which is a rated speed to give a frequency. The frequency is indicated on the horizontal axes. The signal is decomposed into the respective frequency components to express a magnetic flux density in decibels (dB) with 1 [T] as a reference. For example, in the case of the eight-pole permanent magnet of the present embodiment, a fundamental waveform has four wavelengths per cycle, which is converted based on 7200 [rpm] to give 480 [Hz].

By this measuring method, performance relating to a magnetization pattern when manufacturing a motor using this permanent magnet can be inferred. Comparison of FIGS. 3 and 4 exhibits no large change in the fundamental wave component. This is because the magnetizing current is increased in order to compensate for a decrease in magnetization field by the attenuation body 2. In other words, when motors are structured using these permanent magnets, torque generated in the motor is made equivalent. In contrast, a third-order harmonic component and frequency components around it are largely decreased. Furthermore, a fifth-order harmonic component is not substantially changed.

When applying a theory regarding FIG. 5 to the present invention, h=4.6 [mm], and a half wavelength w (=L) of the fundamental wave is 10 [mm], so that an induction current is considered to be suppressed. Accordingly, the canceling effect of the magnetization field by the induction current does not exert on the fundamental wave component. On the other hand, a half wavelength w of the third-order harmonic component is 3.4 [mm], and although it is shorter than h by about 25%, it is considered to be a condition that the induction current relatively easily flows. Accordingly, the canceling effect of the magnetization field by the induction current is generated in this third-order harmonic component.

Furthermore, a half wavelength w of the fifth-order harmonic component is 2.1 [mm], and the induction current is considered to be suppressed. Accordingly, the canceling effect of the magnetization field by the induction current hardly exerts on the fifth-order or higher harmonic component.

EMBODIMENT 2

Figure 6:
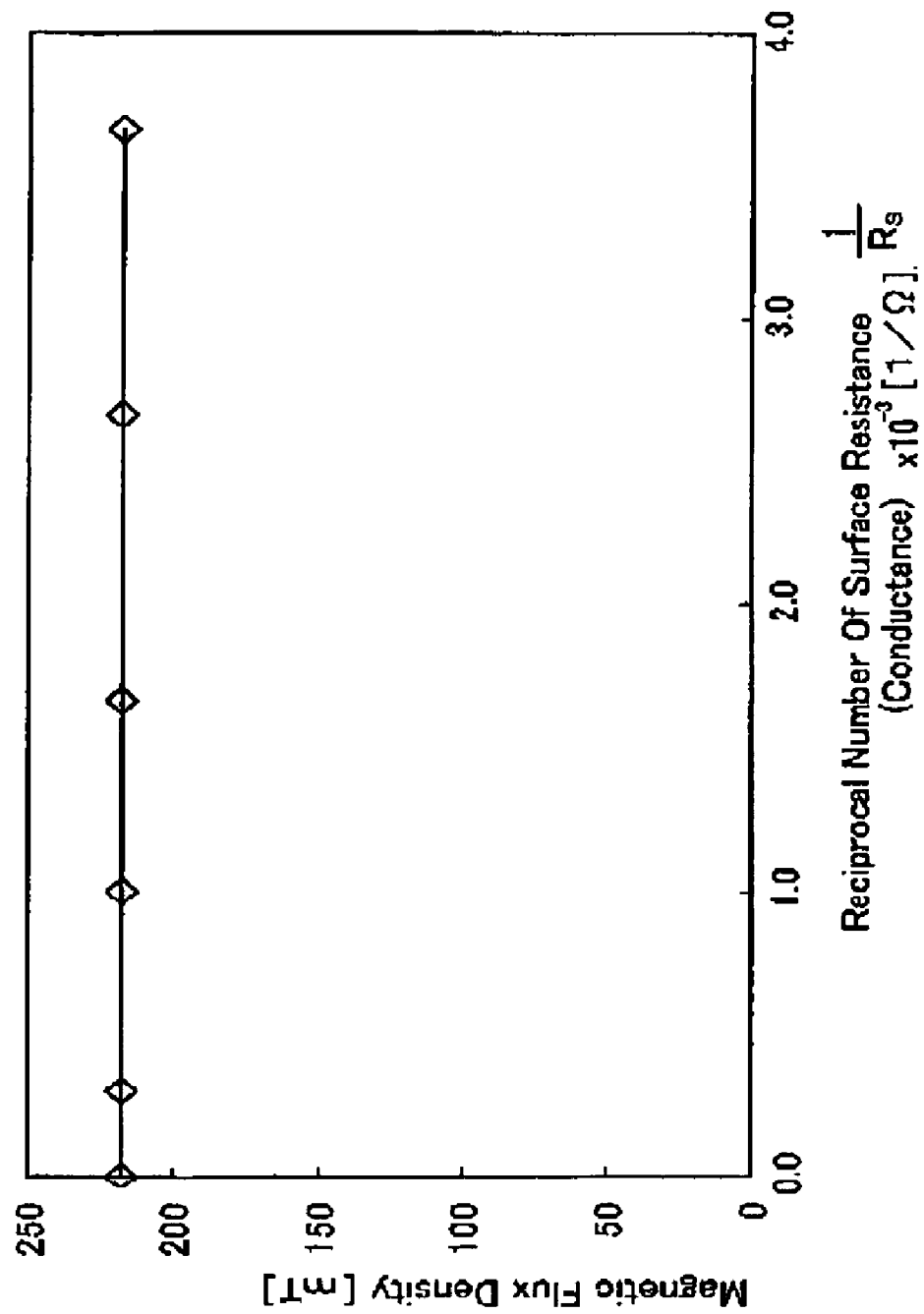
FIG. 6 is a graph showing a relationship between a surface resistance of the attenuation body of the present invention and a fundamental wave component.
Figure 7:
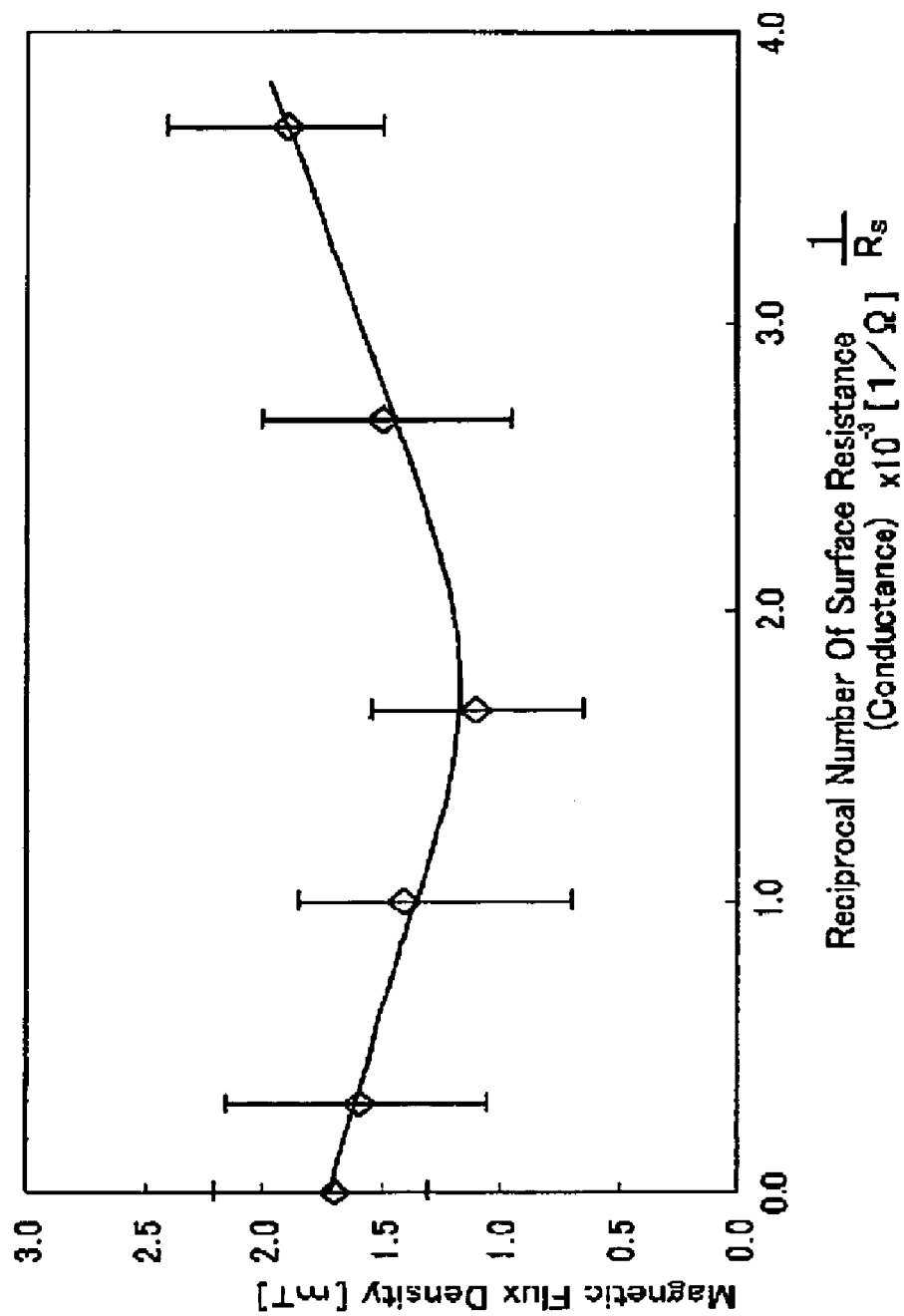
FIG. 7 is a graph showing a relationship between the surface resistance of the attenuation body of the present invention and a third-order harmonic component.
Figure 8:
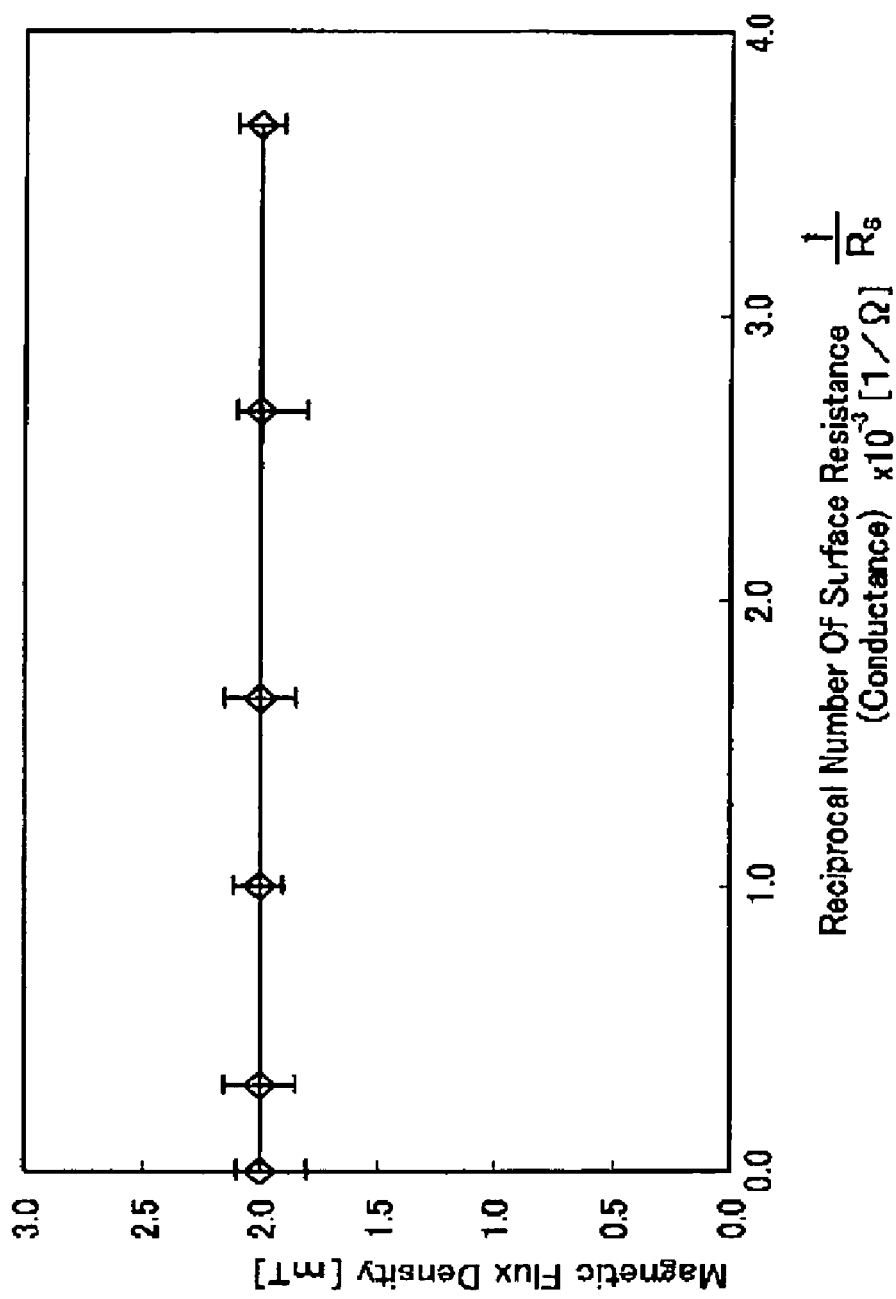
FIG. 8 is a graph showing a relationship between the surface resistance of the attenuation body of the present invention and a fifth-order harmonic component.

A second embodiment of the present invention is described using FIGS. 6 to 8. FIGS. 6 to 8 briefly show a relationship between the surface resistance Rs and the waveform component with respect to each of permanent magnets obtained by magnetizing a plurality of materials to be magnetized and applying copper plating to them differently in thickness to vary the surface resistance.

According to the present embodiment, each of the materials is cylindrical, and is a Nd—Fe—B bond magnet, in which the diameter of the outer circumferential surface is 19.0 [mm], the diameter of an inner circumferential surface is 17.0 [mm], the wall thickness is 0.95 [mm], and the axial height h is 3.6 [mm]. On its surface, plating is applied as the attenuation body, on which an epoxy resin film is formed. The number of magnetized poles is 12, and thus this permanent magnet satisfies formula 3 of the present invention.

The thickness of the plating of the attenuation body is changed so that the surface resistance of the attenuation body Rs is changed from $2.7 \times 10^{-4}$ [Ω/sq.] to infinite (no attenuation body). The respective samples are magnetized so that magnetic flux of the fundamental wave component after magnetization is identical. Furthermore, six samples with respect to the plating thickness are produced and average values, maximum values, and minimum values of the magnetic flux are recorded in the graph.

FIG. 6 shows a relationship between the magnetic flux density and a reciprocal number of surface resistance (conductance) with respect to the fundamental wave component. Since the magnetic flux densities of the fundamental wave components become identical to each other, any of the samples shows an identical magnetic flux density in FIG. 6.

FIG. 7 shows a relationship between the magnetic flux density and the reciprocal number of surface resistance (conductance) with respect to the third-order harmonic component. With an increase in conductance, the magnetic flux density of the third-order harmonic component decreases, but shifts to an increase on reaching a certain limit. A part of harmonic components of the magnetization field are cancelled and attenuated by the induction current generated in the attenuation body. As the induction current is increasing, the magnetization field of the third-order harmonic component becomes weaker, so that the conductance increases. That is, as the induction current is increasing, the magnetization field of the third-order harmonic component becomes weaker. On the other hand, it is considered that when the induction current increases too much, the effect of suppressing the harmonic components is attenuated by the influence of nonuniform components, nonuniformity or disturbance of the attenuation body or the like.

FIG. 8 shows a relationship between the magnetic flux density and the reciprocal number of surface resistance (conductance) with respect to the fifth-order harmonic component. With relation to change in the value of the conductance, change in the magnetic flux density of the fifth-order harmonic component is not exhibited. It is considered that this is because the half wavelength w of the fifth-order harmonic component is shorter than the height h of the attenuation body, and thus the induction current is not so largely generated, so that the effect of suppressing the magnetization field does not exert.

As is clear from the description of FIG. 7, in order to suppress the harmonic components, an optimum range of the surface resistance needs to be selected. According to the embodiment, it is desirable that the conductance is in the range of $1.0 \times 10^3$ to $3.3 \times 10^3 [1/\Omega]$ in order to cancel the harmonic components of the magnetization field. These values are converted to the surface resistance Rs to give $3.0 \times 10^{-4}$ to $1.0 \times 10^{-3} [\Omega/sq.]$.

This optimum value of the surface resistance can vary according to a shape or a size of the material. Therefore, when carrying out the present invention, some try and select is required for the value of the surface resistance. The above-mentioned range, however, can be a rough standard with respect to the material which has a similar or analogous shape to that of the present embodiment.

Figure 9:
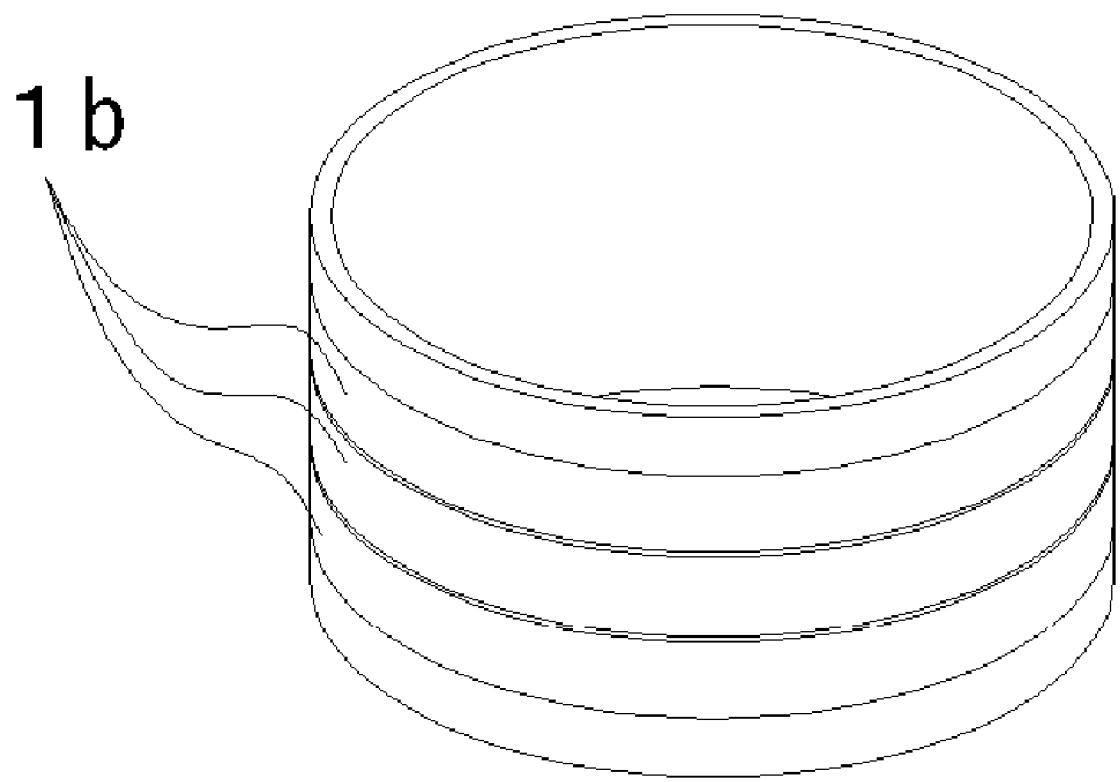
FIG. 9 is a view showing another embodiment in which an attenuation body is mounted on a material to be magnetized according to the present invention.

The embodiment of the present invention is not limited to the described contents. Various modifications can be made as long as the gist of the present invention is followed. For example, as the material, a Sm—Co based bond magnet, a ferrite magnet or the like may be used. Furthermore, the attenuation body may be provided with a slit or may be divided into a plurality in the circumferential or axial direction. For example, as shown in FIG. 9, when divided into a plurality in the axial direction, the axial height h of the attenuation body becomes smaller, so that a permanent magnet in which the magnetization waveform of higher wavelength component is attenuated can be attained.

Figure 10:
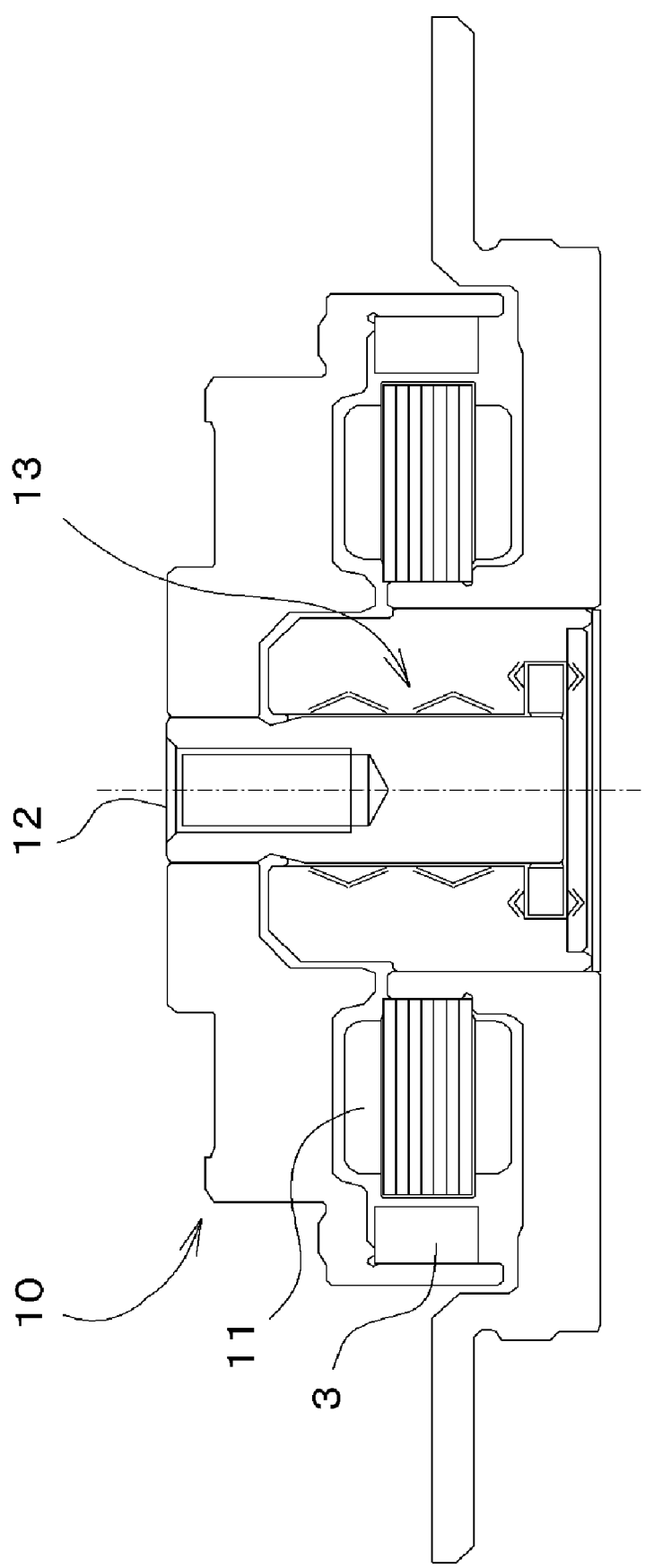
FIG. 10 is a view showing a motor of the present invention.

FIG. 10 is a schematic cross-sectional view of a spindle motor 10 using the permanent magnet of the present invention as the rotor magnet 3. The rotor magnet 3 is a permanent magnet magnetized using the magnetizing device described in the first embodiment, on the surface of which an epoxy resin is formed by electrodeposition painting. This epoxy resin layer may be formed of another corrosion-resistant paint film. Furthermore, this epoxy resin layer may be formed by spray painting or electrostatic painting in addition to electrodeposition painting.

The rotor magnet 3 generates rotational driving force while interacting magnetic force with a stator 11. The spindle motor 10 structured using this rotor magnet 3 has less vibration and high rotation efficiency. Furthermore, this rotor magnet 3 has the corrosion-resistant film applied on the copper-plating, so that the corrosion resistance is high. In addition, since this corrosion resistance is secured under a condition of high temperature and high humidity, it can be used for severe application such as automobile use.

What is claimed is:

1. A magnetizing method for obtaining a permanent magnet for a motor by magnetizing a material to be magnetized wherein:
   an attenuation body made of a conductive material is arranged in contact with or close to at least one surface of the material which is nonconductive;
   thereafter a magnetization field is impressed;
   at least a part of magnetic flux of the magnetization field penetrates both the attenuation body and the surface in contact with or close to the attenuation body simultaneously;
   and the magnetization is performed by a so-called pulse magnetic field which is rapidly intensified and thereafter weakened with respect to elapse of time;
   the material has a platy shape or a tubular shape;
   the material is magnetized in a thickness direction;
   the attenuation body is located along the surface of the material on at least one side in the thickness direction; and
   a surface resistance of the attenuation body expressed by Rs satisfies the formula $$3.0 \times 10-5 \leq Rs \leq 1.0 \times 10-2\ [\Omega/sq.] \qquad (1).$$

2. A magnetizing method for obtaining a permanent magnet for a motor by magnetizing a material to be magnetized wherein:
   an attenuation body made of a conductive material is arranged in contact with or close to at least one surface of the material which is nonconductive;
   thereafter a magnetization field is impressed;
   at least a part of magnetic flux of the magnetization field penetrates both the attenuation body and the surface in contact with or close to the attenuation body simultaneously;
   and the magnetization is performed by a so-called pulse magnetic field which is rapidly intensified and thereafter weakened with respect to elapse of time;
   the magnetization field is generated by passing a pulse current through a magnetizing coil; and
   the pulse current satisfies the formula $$2.0 \times 10-5 \leq \Delta t \leq 5.0 \times 10-3\ [sec.] \qquad (2)$$

where $\Delta t$ is a time from the start of passing the pulse current until the current value reaches the maximum.

3. A magnetizing method according to claim 1, wherein the magnetization field is generated by passing a pulse current through a magnetizing coil; and
   the pulse current satisfies the formula $$2.0 \times 10-5 \leq \Delta t \leq 5.0 \times 10-3\ [sec.] \qquad (2)$$

where $\Delta t$ is a time from the start of passing the pulse current until the current value reaches the maximum.

4. A magnetizing method according to claim 2, wherein the material is a Nd—Fe—B bonded magnetic material.

5. A magnetizing method according to claim 1, wherein the material is a Nd—Fe—B bonded magnetic material.

6. A magnetizing method for obtaining a permanent magnet for a motor by magnetizing a material to be magnetized wherein:
   an attenuation body made of a conductive material is arranged in contact with or close to at least one surface of the material which is nonconductive;
   thereafter a magnetization field is impressed;
   at least a part of magnetic flux of the magnetization field penetrates both the attenuation body and the surface in contact with or close to the attenuation body simultaneously;
   and the magnetization is performed by a so-called pulse magnetic field which is rapidly intensified and thereafter weakened with respect to elapse of time;
   the material has a cylindrical shape;
   the attenuation body is in contact with or close to any one or both of an outer circumferential surface or an inner circumferential surface of the material in such a manner as to cover in a circumferential direction;
   any one or both of the outer circumferential surface and the inner circumferential surface are magnetized simultaneously;
   a plurality poles are arranged alternately in a circumferential direction on the surface of the material; and
   a geometry of a permanent magnet obtained from the material satisfies the formula $$h < \pi R/P\ [mm] \qquad (3)$$

where P is the number of magnetized poles, R [mm] is a diameter of the circumferential surface to be magnetized in the case where one of the surfaces is magnetized, R [mm] is a diameter of the outer circumferential surface in the case where both of the inner circumferential surface and the outer circumferential surface are magnetized and h [mm] is an axial height perpendicular to a radial direction of the material.

7. A magnetizing method according to claim 1, wherein
the material has a cylindrical shape;
the attenuation body is in contact with or close to any one or both of en outer circumferential surface or an inner circumferential surface of the material in such a manner as to cover in a circumferential direction;
any one or both of the outer circumferential surface and the inner circumferential surface are magnetized simultaneously;
a plurality poles are arranged alternately in a circumferential direction on the surface of the material; and
a geometry of a permanent magnet obtained from the material satisfies the formula $$h < \pi R/P \text{ [mm]} \quad (3)$$

where P is the number of magnetized poles, R [mm] is a diameter of the circumferential surface to be magnetized in the case where one of the surfaces is magnetized, R [mm] is a diameter of the outer circumferential surface in the case where both of the inner circumferential surface and the outer circumferential surface are magnetized, and h [mm] is an axial height perpendicular to a radial direction of the material.

8. A magnetizing method according to claim 2, wherein
the material has a cylindrical shape;
the attenuation body is in contact with or close to any one or both of an outer circumferential surface or an inner circumferential surface of the material in such a manner as to cover in a circumferential direction;
any one or both of the outer circumferential surface and the inner circumferential surface are magnetized simultaneously;
a plurality poles are arranged alternately in a circumferential direction on the surface of the material; and
a geometry of a permanent magnet obtained from the material satisfies the formula $$h < \pi R/P \text{ [mm]} \quad (3)$$

where P is the number of magnetized poles, R [mm] is a diameter of the circumferential surface to be magnetized in the case where one of the surfaces is magnetized, R [mm] is a diameter of the outer circumferential surface in the case where both of the inner circumferential surface and the outer circumferential surface are magnetized, and h [mm] is an axial height perpendicular to a radial direction of the material.

9. A magnetizing method according to claim 5, wherein:
the diameter of the outer circumferential surface of the cylindrical material is 10 to 30 [mm];
a wall thickness in the radial direction is 0.5 to 3 [mm]; and
the magnetizing method satisfies the formula $$3.0 \times 10^{-4} \leq Rs \leq 1.0 \times 10^{-3} \text{ [}\Omega/\text{sq.]} \quad (4)$$

where Rs is the surface resistance of the attenuation body.

10. A magnetizing method according to claim 6, wherein the diameter of the outer circumferential surface of the cylindrical material is 10 to 30 [mm];
a wall thickness in the radial direction is 0.5 to 3 [mm]; and
the magnetizing method satisfies the formula $$3.0 \times 10^{-4} \leq Rs \leq 1.0 \times 10^{-3} \text{ [}\Omega/\text{sq.]} \quad (4)$$

where Rs is the surface resistance of the attenuation body.

11. A magnetizing method according to claim 1, wherein
the diameter of the outer circumferential surface of the cylindrical material is 10 to 30 [mm];
a wall thickness in the radial direction is 0.5 to 3 [mm]; and
the magnetizing method satisfies the formula $$3.0 \times 10^{-4} < Rs < 1.0 \times 10^{-3} \text{ [}\Omega/\text{sq.]} \quad (4)$$

where Rs is the surface resistance of the attenuation body.

12. A permanent magnet magnetized in the magnetizing method according to claim 1, wherein the attenuation body is formed integrally with a surface of the material to make up a coating layer.

13. A permanent magnet magnetized in the magnetizing method according to claim 6, wherein the attenuation body is formed integrally with a surface of the material to make up a coating layer.

14. A permanent magnet magnetized in the magnetizing method according to claim 5, wherein the attenuation body is formed integrally with a surface of the material to make up a coating layer.

15. A permanent magnet according to claim 12, wherein a resin layer is formed on, the coating layer formed by the attenuation body.

16. A permanent magnet according to claim 13, wherein a resin layer is formed on the coating layer formed by the attenuation body.

17. A permanent magnet according to claim 14, wherein a resin layer is formed on the coating layer formed by the attenuation body.

18. A motor according to claim 1, wherein the permanent magnet is a driving magnet.

19. A motor according to claim 2, wherein the permanent magnet is a driving magnet.

20. A motor according to claim 3, wherein the permanent magnet is a driving magnet.

21. A motor generating rotational driving force by interaction between a stator comprising a core and a plurality of coils wounded on the core, and a permanent magnet opposed to the stator, wherein
the permanent magnet used in the motor has a cylindrical shape; and
a conductive attenuation body is formed integrally with, in contact with, or close to at least any one or both of an inner circumferential surface and an outer circumferential surface of the permanent magnet;
a surface resistance Rs of the attenuation body satisfies the formula;

$$3.0 \times 10^{-5} \leq Rs \leq 1.0 \times 10^{-2} \text{ [}\Omega/\text{sq.]} \quad (1)$$

a material to be magnetized is a Nd—Fe—B bonded material; and
a geometry of a permanent magnet obtained from the material satisfies the formula $$h < \pi R/P \quad (3)$$

where R is a diameter of the inner circumferential surface or the outer circumferential surface in the case where one of the surfaces is magnetized, R is a diameter of the outer circumferential surface in the case where both of the inner circumferential surface and the outer circumferential surface are magnetized, P is the number of poles of the permanent magnet, and h is an axial length perpendicular to a radial direction.

22. A motor generating rotational driving force by interaction between a stator comprising a core and a plurality of coils and a permanent magnet opposed to the core, wherein
the permanent magnet used in the motor has a cylindrical shape; and
at least any one or both of an inner circumferential surface and an outer circumferential surface of the permanent magnet are coated with a conductive attenuation body;
an attenuation body is integrally formed on the surface of the material;
a surface resistance Rs of the attenuation body satisfies the formula;

$$3.0 \times 10^{-5} \leq Rs \leq 1.0 \times 10^{-2} \ [\Omega/sq.] \quad (1)$$

the material to be magnetized is a Nd—Fe—B based bond magnet; and a geometry of a permanent magnet obtained from the material satisfies the formula $$h < \pi R/P \quad (3)$$

where R is a diameter of the inner circumferential surface or the outer circumferential surface in the case where one of the surfaces is magnetized, R is a diameter of the outer circumferential surface in the case where both of the inner circumferential surface and the outer circumferential surface are magnetized, P is the number of poles of the permanent magnets, and h is an axial length perpendicular to a radial direction;

further, the diameter of the outer circumferential surface of the material is not less than 10 [mm] and not more than 30 [mm], and a wall thickness in the radial direction is not less than 0.5 [mm] and not mare than 3 [mm]; and still further, the surface of the attenuation body is painted with resin to be covered.

* * * * *